Aug. 23, 1938.　　　　A. CHRISTENSEN　　　　2,127,584
CRANK PIN LATHE
Filed June 21, 1937　　　　2 Sheets-Sheet 1

INVENTOR.
Anton Christensen
BY
James Harris Bowen
ATTORNEY.

Aug. 23, 1938.  A. CHRISTENSEN  2,127,584
CRANK PIN LATHE
Filed June 21, 1937  2 Sheets-Sheet 2
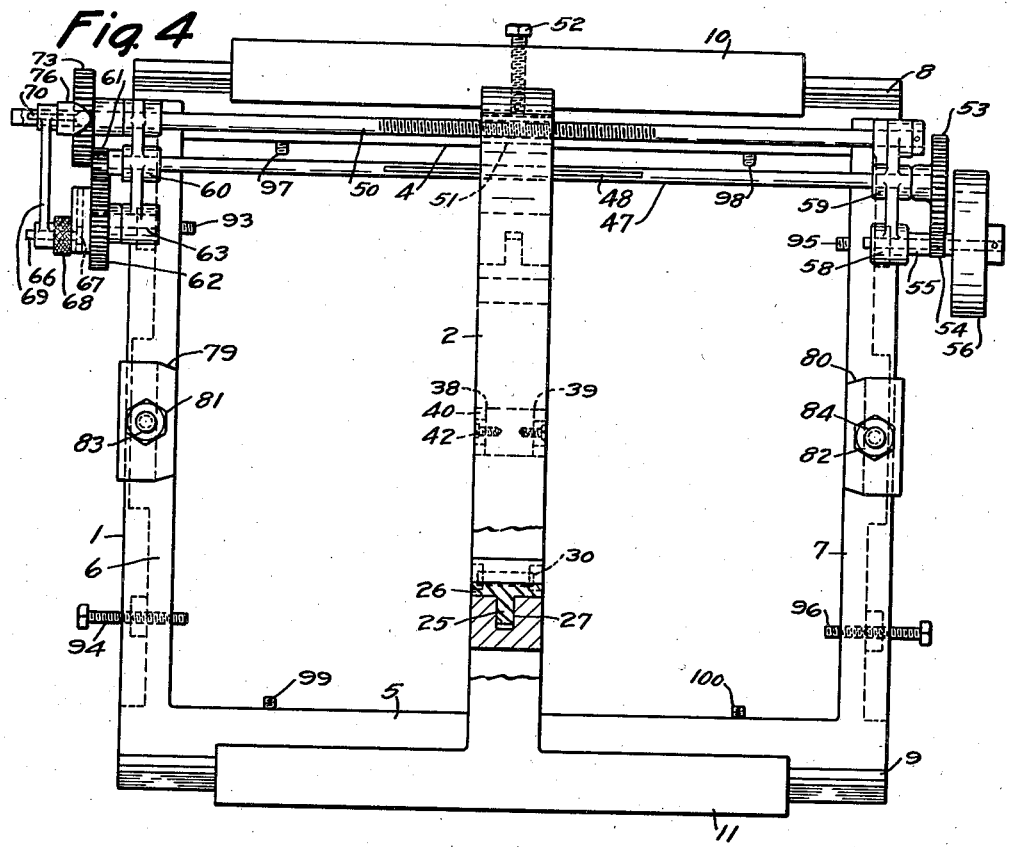
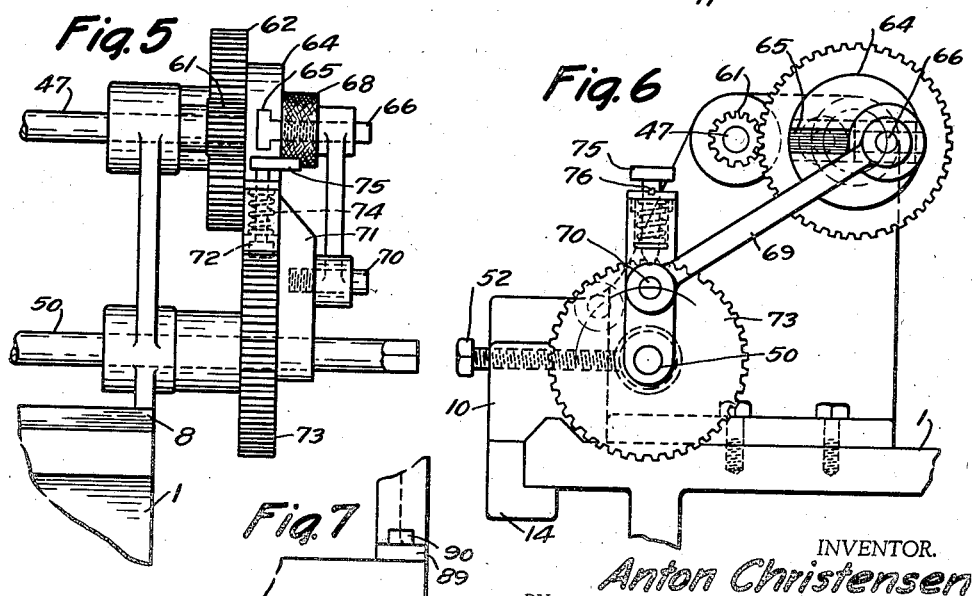
INVENTOR.
Anton Christensen
BY
James Harrison Bower
ATTORNEY.

Patented Aug. 23, 1938

2,127,584

UNITED STATES PATENT OFFICE 2,127,584

CRANK PIN LATHE

Anton Christensen, West Brighton, Staten Island, N. Y.

Application June 21, 1937, Serial No. 149,291

7 Claims. (Cl. 82—4)

The purpose of this invention is to provide a portable machine for turning crankpins, which may readily be set up upon a crank-shaft for turning the individual pins or bearings thereof.

The invention is a frame having clamping and mounting means by which it may readily be set up upon a crankshaft, with a traveling tool rotatable therein, and adapted to travel along the pin, and, at the same time, take a shaving therefrom.

Crank-shafts are normally turned down in lathes by mounting the crank-shaft in an eccentric position, and changing the position for each crankpin, and, although this is satisfactory for comparatively small crankshafts, it is very difficult with relatively large shafts for marine, and other similar engines.

The object of the invention is, therefore, to provide a portable tool, which may readily be mounted upon a crank-shaft, and by which the pins and bearings thereof may readily be turned down.

Another object is to provide a portable crankpin lathe that may readily be trued up on the crank-shaft.

Another object is to provide a crankpin lathe that may be set upon the crank-shaft, and rigidly held in position by clamp screws.

Another object is to provide a crankpin lathe having a traveling cutting tool, in which the direction of travel may readily be reversed.

Another object is to provide a crankpin lathe having a cutting tool, in which the tool travels around the pin with a continuous motion, and along the pin with an intermittent motion.

A further object is to provide a crankpin lathe, which may readily be adjusted to take a cut of any depth desired.

And a still further object is to provide a portable crankpin lathe, which is of a simple and economical construction.

With these ends in view the invention embodies a substantially rectangular shaped frame having tracks at the opposite sides, a ring suspended in the frame and slidably mounted on said tracks, adjustable elevating and clamping means for rigidly mounting said frame on a crank-shaft, operating means for driving said ring along the tracks in either direction, and means rotating the tool about the crankpin.

Other features and advantages of the invention will appear from the following description, taken in connection with the drawings, wherein:

Figure 4 is a plan view of the device with the crank-shaft omitted.

Figure 5 is a detail showing an elevation of the operating mechanism at one corner of the frame.

Figure 6 is a similar detail, showing an end elevation of the operating mechanism shown in Figure 5.

Figure 7 is a detail showing one corner of the frame, illustrating that the end members may be bolted between the side members, providing longitudinal adjustment of the frame, with the shafts slidable in the bearings on said members.

Figure 1:
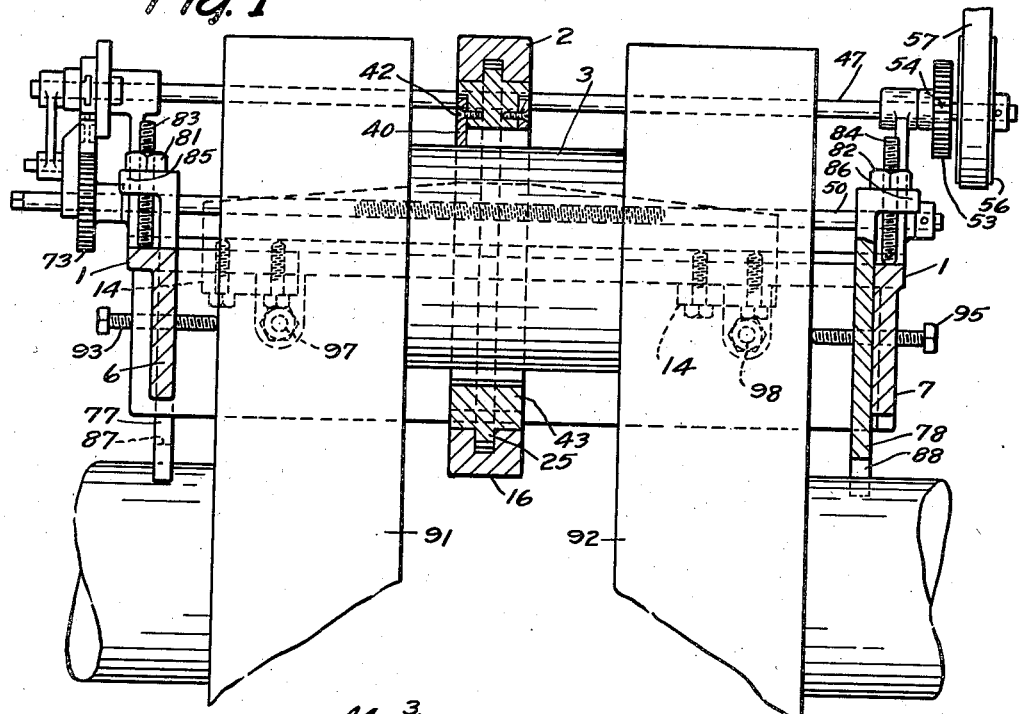
Figure 1 is a view showing a longitudinal section through the device, with the device mounted upon a crankshaft.

In the drawings the device is shown as it may be made, wherein numeral 1 indicates the frame, numeral 2 the traveling ring, and numeral 3 a pin of a crank-shaft upon which the device may be used.

In the drawings the frame 1 is provided with downwardly extending side members 4 and 5, and similar end members 6 and 7, with the frame 1 forming a continuous substantially horizontal flange around the upper edges of the side and end members, and the frame is extended at the sides with substantially V shaped projections 8 and 9, upon which the members 10 and 11 of the ring 2 are slidably mounted through grooves 12 and 13. The members 10 and 11 are slidably held in place by clips 14, secured to the members by bolts 15, and, as these clips, which are located at the opposite corners are the same size and design, the same reference numeral is applied to each.

The ring 2 is formed with an upper section, as indicated by the numeral 2, and a lower section 16, which is suspended from the upper section, and secured thereto by bolts 17 and 18 through flanges 19 and 20, and it will be noted that the flanges may be provided with grooves 21 and 22 which correspond with keys 23 and 24 extending downward from the undersurface of the ends of the upper section 2. These keys and grooves may or may not be used as may be desired, and are only used for locating the lower part of a ring in relation to the upper part.

Figure 2:
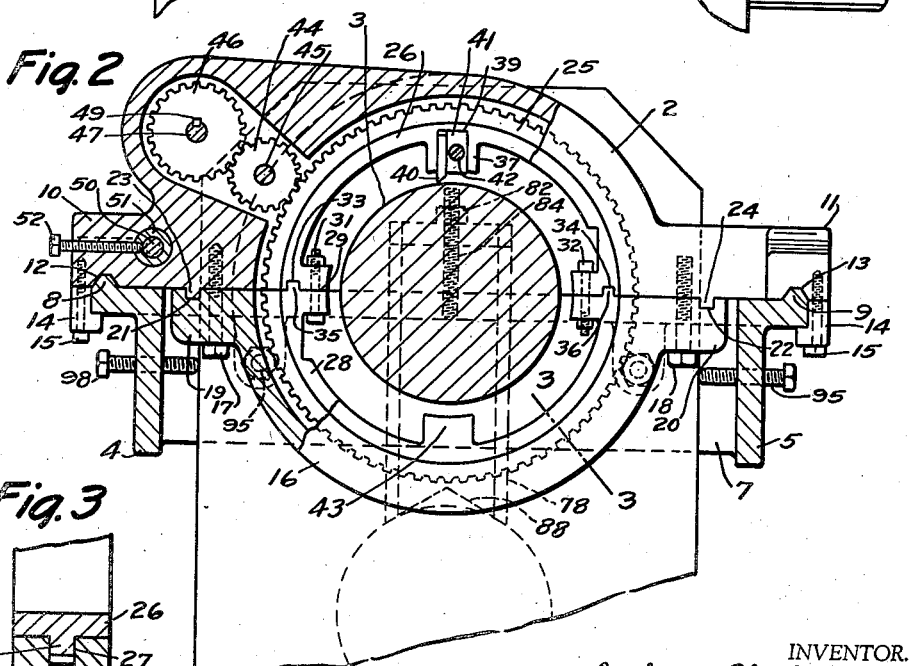
Figure 2 is a view showing a cross-section through the device, and through the crank-shaft pin upon which it may be mounted, with part of the traveling ring shown in elevation.
Figure 3:
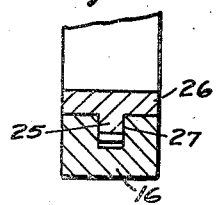
Figure 3 is a detail showing a section through the traveling ring on line 3—3 of Figure 2.

Inside of the ring 2 is a gear 25 formed on the outer surface of a base 26, and this gear is rotatably mounted in a groove 27 in the upper and lower sections of the ring. The gear and base are also formed in two sections, the upper section being indicated by the numeral 26, and the lower section by the numeral 28, and these two sections may be split on a line 29, and as they are mounted against the inner surface of the ring 2 they may be held together by pins 30, as shown in Figure 4, which may be placed in semi-circular openings forming key-ways, locating one section in relation to the other, however, it will also be understood that the two sections may be bolted together by bolts 31 and 32, as shown in Figure 2, extending through projections extending inward from the inner surface of the base, and these parts may also be provided with grooves 33 and 34, and keys 35 and 36, which extend into the grooves for locating the two halves. One of the projections, which extend inward from the inner surface of the base 26, and which is indicated by the numeral 37, is provided with recesses 38 and 39 in the opposite sides, and cutting tools 40 may be clamped in these recesses by plates 41 and screws 42, however, it will be understood that cutting tools 40 may be held or mounted in the gear or base thereof in any manner or by any means. It will also be understood that the projections 43, similar to the projection 37 extending inward from the gear, may be made of any length, so that they may engage the surface of the crankpin 3, forming bearings at four points around the pin, or these projections may be spaced from the crankpin, as shown in Figure 2, or located at any distance therefrom.

The gear 25 is driven by a gear 44 on a shaft 45, and this gear is driven by a gear 46 on a shaft 47 which extends through the upper part of the ring 2. The shaft is provided with a keyway 48, and the gear with a key 49, which travels in the key-way as the ring is moved back and forth in the frame, thereby causing the gear to rotate continuously with the travel thereof.

The ring 2 is operated by a shaft 50 having a threaded bushing 51 thereon, in which the central portion of the shaft is threaded as shown in Figure 4, and with the bushing secured in the ring 2 by a set-screw 52, the ring will be fed along the shaft by the screw threads as the shaft 50 rotates.

The shaft 47 is rotated continuously by a gear 53 on one end thereof, and this gear meshes with a pinion 54 on a shaft 55, on the outer end of which a pulley 56 is mounted, and it will be noted that the pulley 56 may be driven by any rotating means through a belt 57. It will be understood, however, that this device may be directly geared to a small motor, or driven from a counter shaft or operated by any suitable means.

The shaft 55 is mounted in a bearing 58, and the ends of the shaft 47 are mounted in bearings 59 and 60 at the opposite ends of the frame 1. At the opposite end of the shaft 47 is a pinion 61, which meshes with a gear 62 on a shaft 63, and on the face of the gear 62 is a disc 64 having a slot 65 therein, and a pin 66, which is formed with a head 67, is slidably mounted in the slot 65 and rigidly held in any position therein by a nut 68, which may be tightened against the outer surface of the disc 64. An arm 69 is mounted on the outer end of the pin 66, and the opposite end of the arm is mounted on a pin 70 on a lever 71, which is pivotally mounted on the end of the shaft 50, and free to move backward and forward thereon. At the upper end of the member 71 is a ratchet 72 resiliently held against a gear 73 by a spring 74, and the ratchet is formed on a pin having a head 75 that may be turned to reverse the position of the ratchet, so that the gear 73 may be turned in either direction. The ratchet pin is also provided with a bar 76 that may be raised out of notches in the frame, and placed on the upper end thereof to hold the ratchet in a neutral position to permit turning by hand. With the ratchet in the position shown in Figures 5 and 6, the lower end will slip over the teeth of the gear 73 when it is moved in one direction, and will hold in the teeth when it is moved in the opposite direction, whereas, with the position of the ratchet reversed, it will slip over the teeth in one direction, and cause the gear to move in the other, thereby reversing the direction of rotation of the shaft 50. It will also be noted that the distance of travel of the ratchet 72 may be adjusted by changing the position of the pin 66 in the slot 65. This provides an intermittent motion or travel for the ring upon the frame, however, it will also be understood that it may be desired to use a continuous travel, and, in that event, the eccentric may be omitted, and the shaft 50 directly driven. It will also be understood that any means may be used in driving one shaft in relation to the other.

The frame 1 is positioned over an offset section of a crank-shaft, as shown in Figure 1, with the ring 2 concentric about a crankpin 3 in the offset section, and in placing the frame on the crank-shaft the position thereof may be adjusted by sliding plates 77 and 78 slidably mounted in grooves 79 and 80 in the ends 6 and 7 of the frame, and the position of these plates may be adjusted by nuts 81 and 82, on the upper ends of screws 83 and 84, which extend upward from the frame 1, and through flanges 85 and 86 at the upper ends of the plates 77 and 78. The lower ends of the plates are provided with V shaped notches 87 and 88, which rest upon the adjoining bearings of the crank-shaft. The length of the frame may be adjusted to accommodate different size crank-shafts, by mounting the ends between the side members with flanges 89 thereof held to the side members by bolts 90 as shown in Figure 7.

The frame 1 is clamped between the vertical members of the crank-shaft between the crank-pins, as indicated by the numerals 91 and 92, by clamp screws 93, 94, 95, and 96, extending through the opposite sides, and 97, 98, 99 and 100, extending through the opposite ends, and after the device is in place these screws are turned inward until the frame is clamped in place. It will be understood, however, that any means may be provided for securing the frame on a section, or any part, of a crank-shaft.

It will be understood that other changes may be made in the construction without departing from the spirit of the invention. One of which changes may be in the shape or general design of the frame, another may be in the use of other means for slidably mounting the ring upon the frame, and another may be in the use of other means for feeding and rotating the tool mounted in the frame.

The construction will be readily understood from the foregoing description. In use the device may be provided as shown and described, and it will be noted that it may be placed over a section of a crank-shaft, clamped in place, and the tool holding operating ring secured about the crankpin, with the tool adjusted to true up the crankpin, or take a light shaving therefrom, and, with the tool started at one end, the device may be set so that it will travel along the crankpin, and this may be moved backward and forward as many times as may be desired. The tool may be placed in either side of the ring, so that it will be possible to cut into the corner at each end of the crankpin.

In placing this device upon a crank-shaft, the bearing is removed from the crankpin to be turned, and the top bearings of the two adjoining main crank-shaft bearings are also removed. The crank-shaft is then turned, so that the pin to be turned is on top center. Then, with the gear ring 2, and also the gear, separated or disconnected, the machine is lowered down over the crank-shaft until the plates 77 and 78 rest upon the upper surface of the adjoining crank-shaft bearings. The lower halves of the gear ring and case are then reinstalled, and the device is adjusted by the screws at the uper ends of the plates 77 and 78, and by the screws extending through the walls thereof, until the gear ring is centered about the crankpin, and the machine parallel with the center thereof. The cutting tool may then be adjusted, and the machine started and operated as hereinbefore described.

This machine has been shown and described as being driven by a motor, or from a counter-shaft, or any suitable means, however, it will also be noted that the shaft 50 is provided with a square end, so that it may be turned by a crank, wheel, or a handle, by hand, therefore making it possible to feed and operate the tool by hand.

Having thus fully described the invention, what I claim as new, and desire to secure by Letters Patent, is:

1. A tool for turning crankpins of crank-shafts, comprising a frame adapted to be placed over an offset portion of a crank-shaft, surrounding said offset portion and resting upon bearing sections of the crank-shaft, means rigidly clamping said frame to the offset portion of the crank-shaft, a cutting tool, a traveling ring positioned about a crankpin in the said offset portion of the crank-shaft adapted to travel around said crankpin, and means feeding said tool along said crankpin with an intermittent motion, said traveling ring holding said tool, said device characterized in that the frame is positioned over the said offset portion of the crank-shaft, and located substantially on the center line of the crankpin, and further characterized in that the said traveling ring is mounted in a carriage with extending ends, and the ends are provided with V shaped grooves freely slidable on T shaped ridges of the said frame.

2. A device as described in claim 1, in which the tool holding ring is formed in two sections slidably mounted in a casing, also formed in two sections, said tool holding ring having a gear on the outer surface thereof, shafts extending through said casing and mounted on said frame, clamped to the offset portion of the crank-shaft, gears driving the gear on said tool holding ring from one of said shafts, a threaded bushing cooperating with threads on another of said shafts, providing feeding means, and means rotating said shafts.

3. A device as described in claim 1, in which the tool holding ring is formed in two sections slidably mounted in a casing, also formed in two sections, said tool holding ring having a gear on the outer surface thereof, shafts, extending through said casing and mounted on said frame, clamped to the offset portion of the crank-shaft, gears driving the gear on said tool holding ring from one of said shafts, a threaded bushing cooperating with threads on another of said shafts, providing feeding means, and means rotating said shafts, one of said shafts being rotated with an intermediate motion, and means releasing and reversing said intermediate feeding means.

4. In a crank-shaft pin turning tool of the type comprising a substantially rectangular shaped frame adapted to be placed over and around the offset portion of the crank-shaft in which the pin is positioned, and in which means is provided for holding a tool, and moving said tool along the crankpin; a tool holding split ring gear adapted to be mounted around said crankpin, a split frame also adapted to be mounted around said pin and in which the gear ring is rotatably mounted, said frame having extended ends slidably mounted upon the said rectangular shaped frame and also slidable upon feeding and operating shafts mounted in said rectangular shaped frame and extending therethrough, means on said rectangular shaped frame for rotating said shafts, and means rotating said ring gear with the tool therein as one of the said shafts is rotated, one of said shafts providing feeding means causing the said split frame to travel in said rectangular shaped frame, said device characterized in that the entire mechanism is substantially positioned on the center of the said crank-shaft pin providing equal distribution of the load thereof, and adjustably positioned from adjoining pins by slidably mounted plates in the opposite ends thereof, and further characterized by bolts threaded through the walls of said rectangular shaped frame and engaging transverse members of the crank-shaft upon which it may be mounted.

5. A device, as described in claim 4, in which the said split frame is positively held downward upon said rectangular shaped frame.

6. A device, as described in claim 4, in which the said mechanism for the said split frame operates with an intermittent motion.

7. A device, as described in claim 4, characterized in that the cutting tool is adapted to be mounted on either side of the said ring gear for cutting into the corners at the ends of the said crankpin.

ANTON CHRISTENSEN.